United States Patent
Pinkos et al.

(10) Patent No.: US 11,476,706 B2
(45) Date of Patent: Oct. 18, 2022

(54) WIRELESS DEVICE CHARGER WITH COOLING DEVICE

(71) Applicant: Aptiv Technologies Limited, St. Michael (BB)

(72) Inventors: Andrew F. Pinkos, Clarkston, MI (US); John Mecca, Oakland Township, MI (US); George W. Powell, Jr., Cortland, OH (US)

(73) Assignee: APTIV TECHNOLOGIES LIMITED

( * ) Notice: Subject to any disclaimer, the term of this patent is extended or adjusted under 35 U.S.C. 154(b) by 108 days.

(21) Appl. No.: 16/990,346

(22) Filed: Aug. 11, 2020

(65) Prior Publication Data

US 2021/0050741 A1 Feb. 18, 2021

Related U.S. Application Data

(60) Provisional application No. 62/887,929, filed on Aug. 16, 2019.

(51) Int. Cl.
| | |
|---|---|
| *H02J 50/00* | (2016.01) |
| *B60R 16/03* | (2006.01) |
| *H02J 7/00* | (2006.01) |
| *H02J 50/10* | (2016.01) |

(52) U.S. Cl.
CPC ............ *H02J 50/005* (2020.01); *B60R 16/03* (2013.01); *H02J 7/0042* (2013.01); *H02J 50/10* (2016.02)

(58) Field of Classification Search
CPC ........ H02J 50/005; H02J 50/10; H02J 7/0042; B60R 16/03
USPC ........................................................ 320/108
See application file for complete search history.

(56) References Cited

U.S. PATENT DOCUMENTS

| | | | |
|---|---|---|---|
| 6,362,594 B2 | 3/2002 | Kajiura | |
| 9,445,524 B2 | 9/2016 | Lofy et al. | |
| 10,782,752 B2* | 9/2020 | Koo | ...................... H02J 7/0042 |
| 2016/0276866 A1* | 9/2016 | Lachnitt | .................. H04M 1/04 |
| 2017/0047769 A1 | 2/2017 | Kim et al. | |
| 2017/0338023 A1 | 11/2017 | Ansari et al. | |
| 2018/0224909 A1* | 8/2018 | Koo | ........................ H02J 50/10 |
| 2019/0014683 A1 | 1/2019 | Han | |
| 2021/0126482 A1* | 4/2021 | Selby | .................. H02J 7/00309 |
| 2021/0251109 A1* | 8/2021 | Wippler | ................ H02J 7/0047 |
| 2021/0267098 A1* | 8/2021 | Wippler | .................... F28D 5/02 |

(Continued)

FOREIGN PATENT DOCUMENTS

| | | |
|---|---|---|
| CN | 208479249 U | 2/2019 |
| DE | 202017107183.9 U1 | 12/2017 |

(Continued)

OTHER PUBLICATIONS

Extended European Search Report for EP Application No. 20190869.6, dated Mar. 3, 2021, 11 pages.

*Primary Examiner* — Suchin Parihar
(74) *Attorney, Agent, or Firm* — Billion & Armitage

(57) ABSTRACT

A wireless device charger configured to be installed within a passenger cabin of a vehicle includes a source coil configured to generate an alternating magnetic field and a housing in pneumatic communication with the passenger cabin. The housing defines an inlet port that is configured to induct air from the passenger cabin into the housing. The wireless device charger further incorporates an air movement device configured to produce an air flow into the inlet port and through the housing.

18 Claims, 9 Drawing Sheets

(56) References Cited

U.S. PATENT DOCUMENTS

2021/0391734 A1* 12/2021 Selby ................... H02J 50/402
2022/0006322 A1* 1/2022 Chen .................. H05K 7/20909

FOREIGN PATENT DOCUMENTS

| DE | 102018201300 A1 | 8/2019 |
| EP | 2858201 A1 | 4/2015 |
| JP | 2012216569 A | 11/2012 |

* cited by examiner

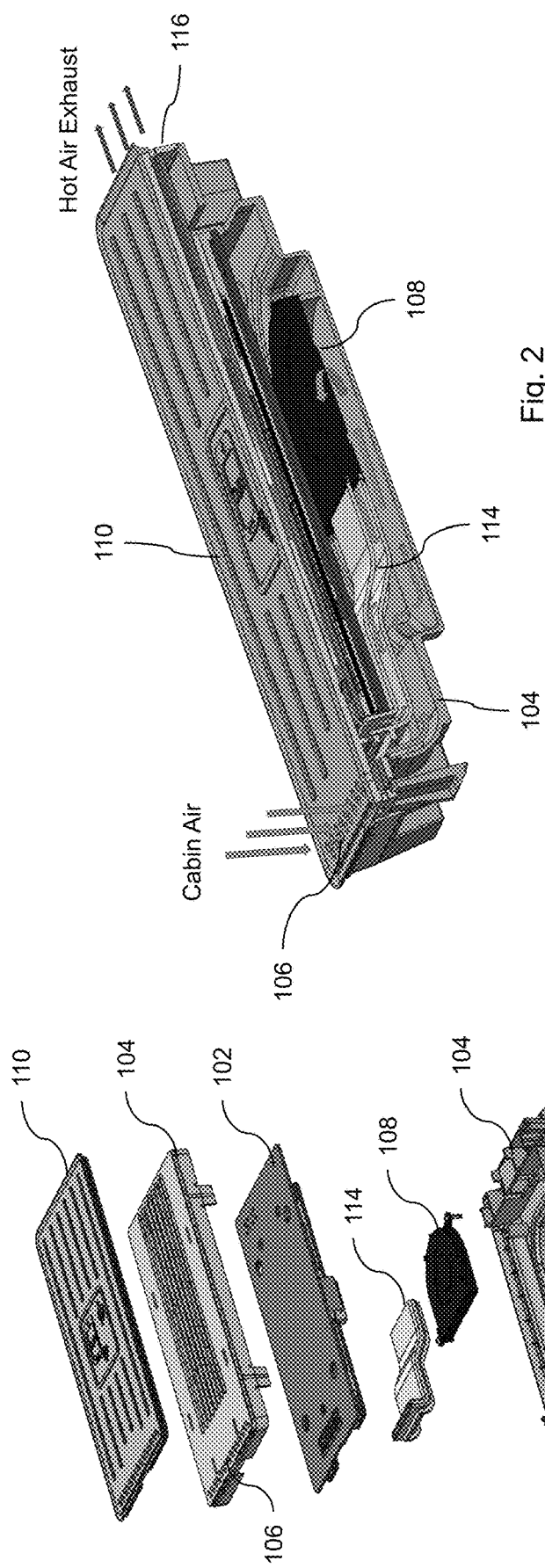

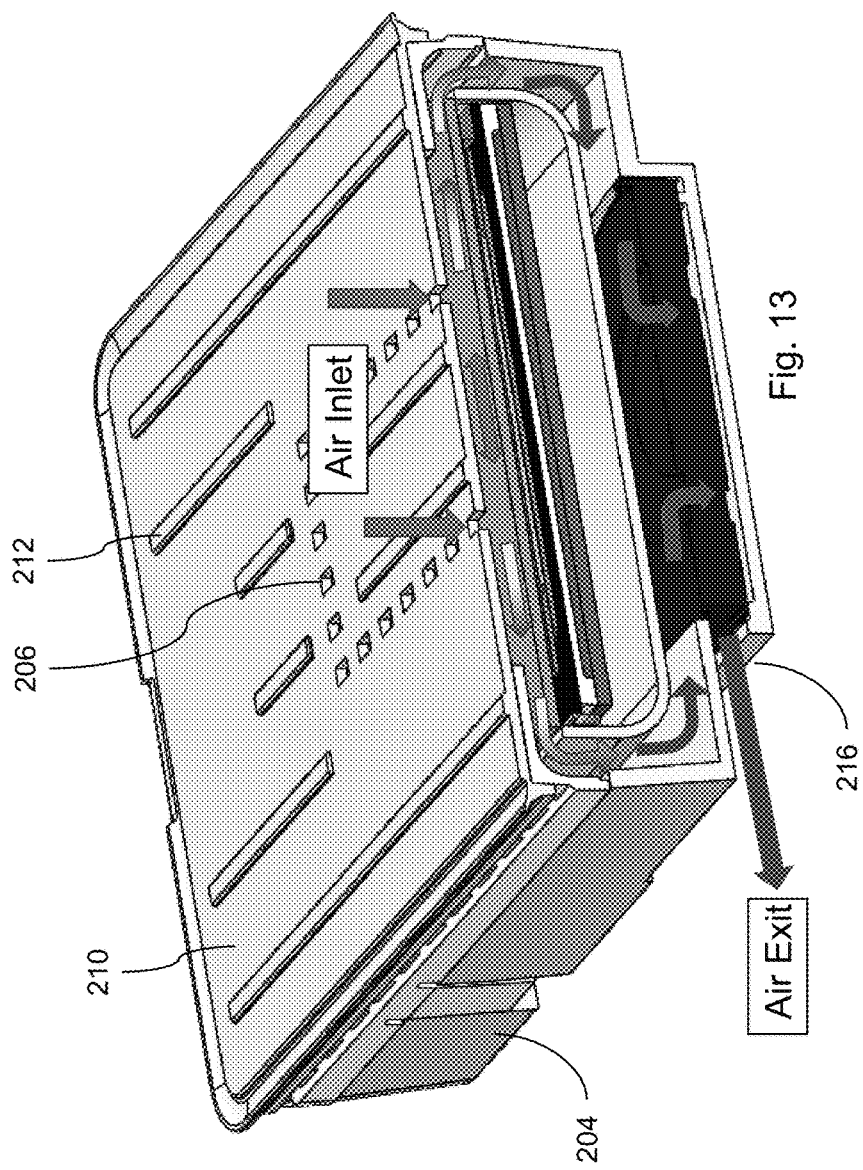
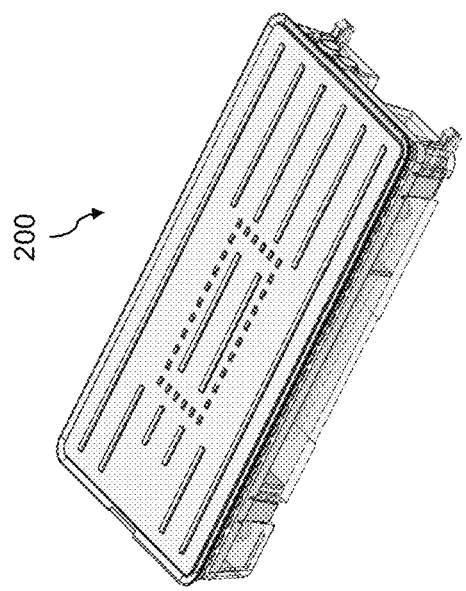

WIRELESS DEVICE CHARGER WITH COOLING DEVICE

CROSS-REFERENCE TO RELATED APPLICATION

This application claims the benefit of priority to Application No. 62/887,929 filed on Aug. 16, 2020, the entire disclosure of which is hereby incorporated by reference.

TECHNICAL FIELD OF THE INVENTION

The invention generally relates to wireless device chargers and more particularly to a wireless device charger having a cooling device to remove heat from the assembly.

BACKGROUND OF THE INVENTION

Wireless device chargers (WDCs) based on inductive coupling have been used to connect with personal electronic devices (PEDs) such as cellular telephones, portable computers, and wearable electronic devices. The WDC contains a source coil through which an alternating electrical current passes, thereby generating an alternating magnetic field. The alternating magnetic field induces an alternating current in a capture coil, thereby transferring electrical power from the WDC to the PED. Typically, the WDC does not include any active methods to reduce internally generated heat which could be transmitted to the PED which is usually in proximity to the WDC. Heating of the PED may limit the ability for the PED charge at its maximum rate. Charge rate can be affected by physical parameters such as the coupling between source coil and capture coil, the battery state of charge (SOC), and the battery temperature. Electrical losses caused by resistance and eddy currents in the source coil of the WDC generate heat which may be thermally coupled to the PED, heating the PED and thereby reducing its ability to charge at maximum rate. Therefore, it is beneficial to reduce heat transfer between the WDC and the PED.

Automotive applications of wireless battery chargers have additional issues regarding heat transfer from the WDC to the PED since the packaging constraints are typically very tight thereby reducing air movement around the WDC for convective cooling. Additionally, the WDC may be packaged near components having temperatures above the ambient temperature in the vehicle, e.g. heating ducts.

Design of the source and capture coils require design tradeoffs for efficiencies and operation. One issue is that as transmitted power increases to match conductive connected charging system, losses within the coils also increase causing the source and capture coils will generate more heat. The most effective method to counteract this is to improve coupling efficiency between the source and capture coils. However, the major losses then become the coil ($i^2R$) and ferrite (eddy current) losses. The coils may be designed with lower impedance but must be designed with optimum operation at the fundamental operating frequency for best power transfer. Therefore, resistance at frequency (impedance) is typically not the primary parameter used for an efficient coil design. Selecting a ferrite for low eddy current losses is also not practical for maximizing power transfer, so eddy current losses are accepted for what they are.

Accordingly, there remains a need to provide a WDC with high transfer efficiency while reducing thermal transfer from the WDC to the PED.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to an embodiment of the invention, a wireless device charger configured to be installed within a passenger cabin of a vehicle is provided. The wireless device charger includes a source coil configured to generate an alternating magnetic field and a housing in pneumatic communication with the passenger cabin. The housing defines an inlet port configured to induct air from the passenger cabin into the housing. The wireless device charger also includes an air movement device that is configured to produce an air flow into the inlet port and through the housing.

In an example embodiment having one or more features of the wireless device charger of the previous paragraph, a top surface of the housing may be configured to allow a personal electronic device to rest upon the top surface and the top surface may define the inlet port.

In an example embodiment having one or more features of the wireless device charger of one of the previous paragraphs, the top surface may define a plurality of protrusions extending from the top surface. The plurality of protrusions may be configured to provide an air space between the personal electronic device and the top surface.

In an example embodiment having one or more features of the wireless device charger of one of the previous paragraphs, the inlet port may be sized, arranged, and located such that the air from the passenger cabin flows through the air space between the personal electronic device and the top surface before entering the inlet port when the air movement device produces the air flow into the inlet port and through the housing.

In an example embodiment having one or more features of the wireless device charger of one of the previous paragraphs, the inlet port may include a plurality of openings extending through the top surface.

In an example embodiment having one or more features of the wireless device charger of one of the previous paragraphs, the plurality of openings may be interspersed between the plurality of protrusions.

In an example embodiment having one or more features of the wireless device charger of one of the previous paragraphs, at least a portion of the plurality of openings may be in the form of a plurality of elongated slots.

In an example embodiment having one or more features of the wireless device charger of one of the previous paragraphs, the plurality of protrusions may be in the form of a plurality of elongated ribs.

In an example embodiment having one or more features of the wireless device charger of one of the previous paragraphs, the top surface may have a rectangular shape and the plurality of protrusions and the plurality of elongated slots may be arranged parallel to a minor axis of the top surface.

In an example embodiment having one or more features of the wireless device charger of one of the previous paragraphs, the plurality of elongated ribs may be a first plurality of elongated ribs and the plurality of protrusions may include a second plurality of elongated ribs arranged parallel to a major axis of the top surface.

In an example embodiment having one or more features of the wireless device charger of one of the previous paragraphs, at least a portion of the plurality of openings may be in the form of plurality of circular apertures.

In an example embodiment having one or more features of the wireless device charger of one of the previous paragraphs, the plurality of protrusions may each have a spherical cap shape.

In an example embodiment having one or more features of the wireless device charger of one of the previous paragraphs, the plurality of protrusions may each have a cylindrical shape.

In an example embodiment having one or more features of the wireless device charger of one of the previous paragraphs, the inlet port may be arranged in a central portion of the top surface.

In an example embodiment having one or more features of the wireless device charger of one of the previous paragraphs, the housing may be configured so that the air flow through the inlet port passes over two different sides of the source coil.

In an example embodiment having one or more features of the wireless device charger of one of the previous paragraphs, a first portion of the inlet port through which the air is inducted from the from the passenger cabin of the vehicle may be generally orthogonal to a second portion of the inlet port through which the air flow is exhausted into the housing.

In an example embodiment having one or more features of the wireless device charger of one of the previous paragraphs, a third portion of the inlet port opposite the first portion may define an opening opposite the first portion through which contaminants entering the inlet port from the passenger cabin can exit the inlet port without passing through the second portion.

In an example embodiment having one or more features of the wireless device charger of one of the previous paragraphs, the top surface may have a rectangular shape and the housing may include an air duct configured to route the air flow through the housing in a direction that is generally parallel to a minor axis of the top surface.

In an example embodiment having one or more features of the wireless device charger of one of the previous paragraphs, the source coil may be sealed from the air duct.

In an example embodiment having one or more features of the wireless device charger of one of the previous paragraphs, the wireless device charger may further include controller circuitry configured to control the air movement device to modulate the air flow via the air based on a temperature of the personal electronic device.

BRIEF DESCRIPTION OF THE SEVERAL VIEWS OF THE DRAWING

The present invention will now be described, by way of example with reference to the accompanying drawings, in which:

FIG. 1 is an exploded perspective view of a wireless device charger (WDC) according to some embodiments;

FIG. 2 is a cross section perspective view of the WDC of FIG. 1 according to some embodiments;

FIG. 12 is a perspective view of a WDC according to some embodiments;

FIG. 13 is a cross section perspective view of the WDC of FIG. 12 according to some embodiments;

DETAILED DESCRIPTION OF THE INVENTION

Figure 3:
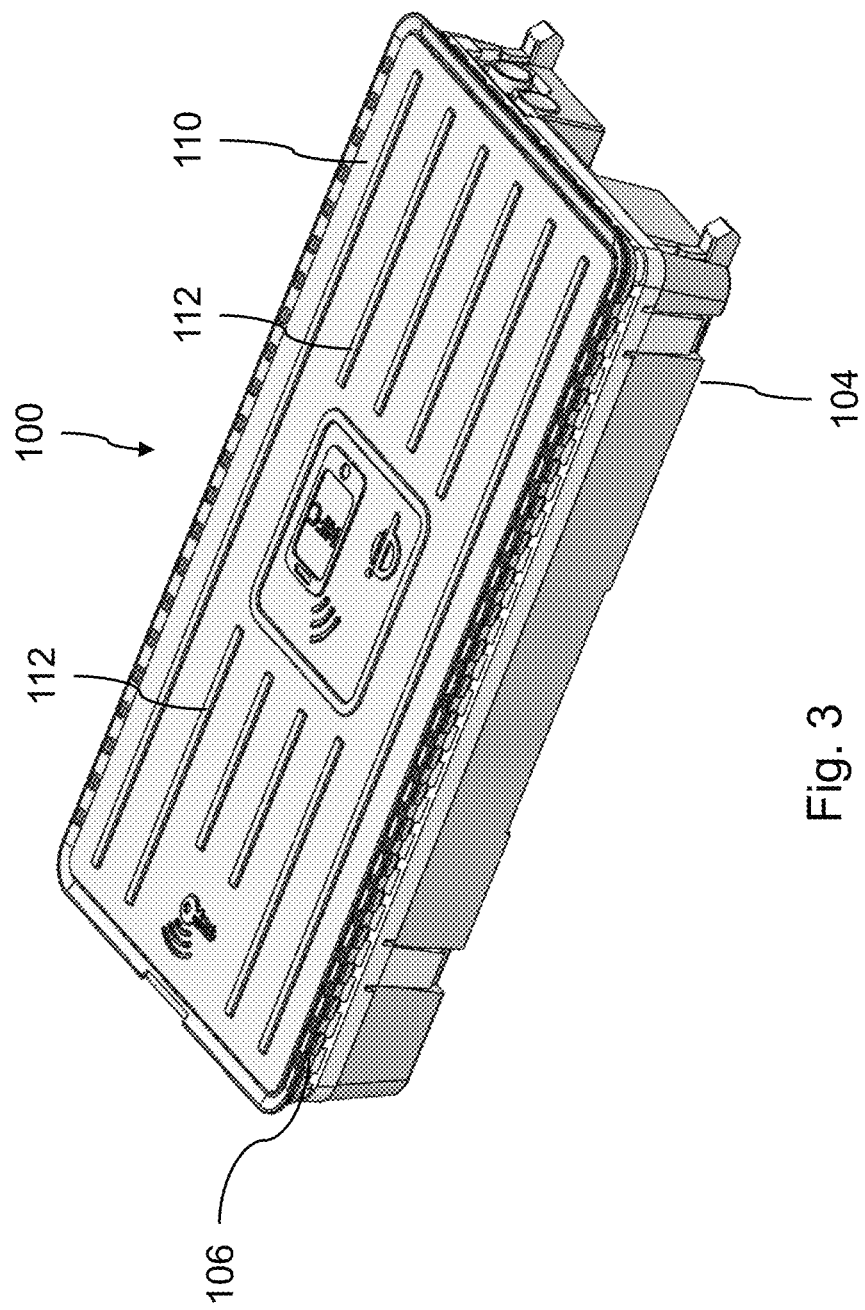
FIG. 3 is a perspective view of the WDC of FIG. 1 according to some embodiments.

Lithium-ion batteries used within today's personal electronic devices (PEDs), e.g. cellular telephones, follow standards to protect the PED battery from being exposed to excessive temperatures. The Japan Electronics and Information Technology Industries Association (JEITA) has established guidelines for improving battery charging safety by setting this upper temperature threshold at 60° C. Typical PED charging temperatures range between −10° C. to +60° C.

The Wireless Power Consortium (WPC) has released a Medium Power (MP) specification for wirelessly charging PEDs covering received power to the PED of up to 60 watts (W), and have an Enhanced Power (EP) subset for PEDs to accept up to 15 W or wireless power, which is equivalent to fast charging capability for a USB wired connection to the charger. This EP subset is beneficial to automotive wireless device chargers (WDCs) allowing wireless fast charging to match the charging rate capability of a wired USB charger. Original equipment manufacturers (OEMs) of motor vehicles are now demanding this capability.

When the temperature threshold is approached or exceeded, the WDC is typically programmed to reduce the power supplied to the PED or discontinue charging until a lower temperature is obtained. This reduction or cessation of power from the WDC to the PED increases battery charging time.

The WDC described herein will improve PED charging performance by removing or redistributing heat from the WDC and/or the PED, thereby extending the amount of time WDC can provide power at a higher power level and providing higher state of charge (SOC) of the PED battery over a shorter time period by eliminating charging interruption due to exceeding the temperature threshold. This is critical to PED charging, especially if the PED has an excessively low SOC.

FIGS. 1-11 illustrate a first embodiment of the WDC 100 that is configured to be installed within a passenger cabin of a vehicle. The WDC 100 includes a source coil and printed circuit board assembly 102 that is configured to generate an alternating magnetic field. The WDC also includes a housing 104 that is in pneumatic communication with the passenger cabin of the vehicle, i.e. at least a portion of the housing is exposed to air in the cabin. The housing 104 defines an inlet port 106 that is configured to induct air from the cabin into the housing 104. The WDC also includes an air movement device 108, e.g. a fan, that is configured to produce or induce an air flow from the cabin, into the inlet port 106, and through the housing 104.

A top surface 110 of the housing 104 is configured to be exposed within the cabin. The top surface 110 is shaped, sized, and arranged to allow a PED 10 to rest upon the top surface 110. This top surface 110 defines the inlet port 106. The top surface 110 also defines a plurality of protrusions 112 in the form of longitudinal ribs 112 that extend from the top surface 110. These ribs 112 provide an air space between the personal electronic device and the top surface. In the illustrated example, the ribs 112 may allow passive cooling by convection currents to form that remove heat from both the WDC 100 and the PED 10 laying on the top surface 110 while charging. While the protrusions 112 of the embodiment illustrated in FIGS. 1-11 ribs arranged longitudinally on the top surface 110, alternative embodiments may be envisioned in which ribs are arranged laterally or skew. The protrusions alternatively may have a spherical cap shape, a cylindrical shape, or a frustoconical shape.

Figure 4:
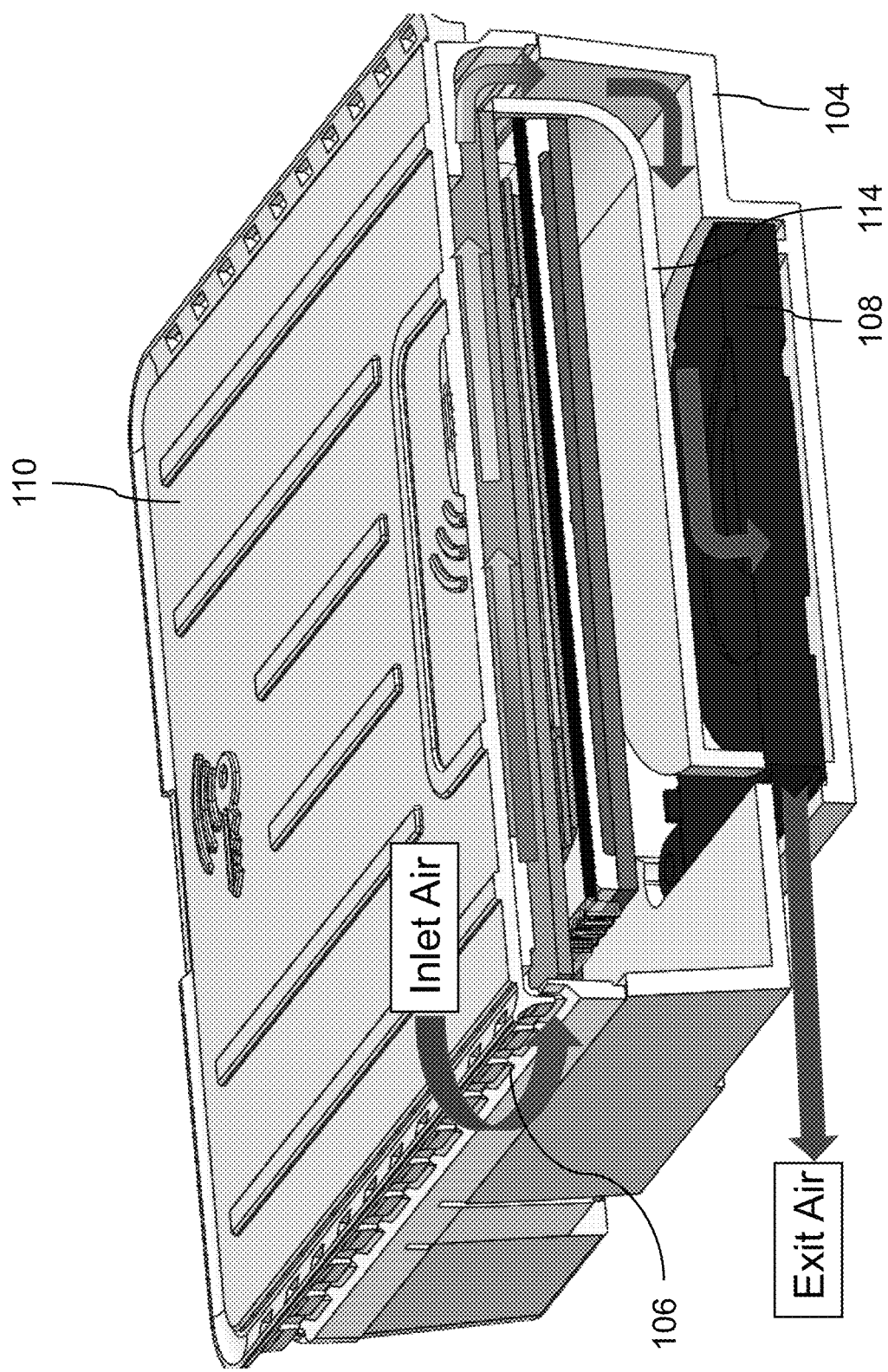
FIG. 4 is a perspective cross section view of the WDC of FIG. 1 illustrating an air flow path according to some embodiments.
Figure 6:
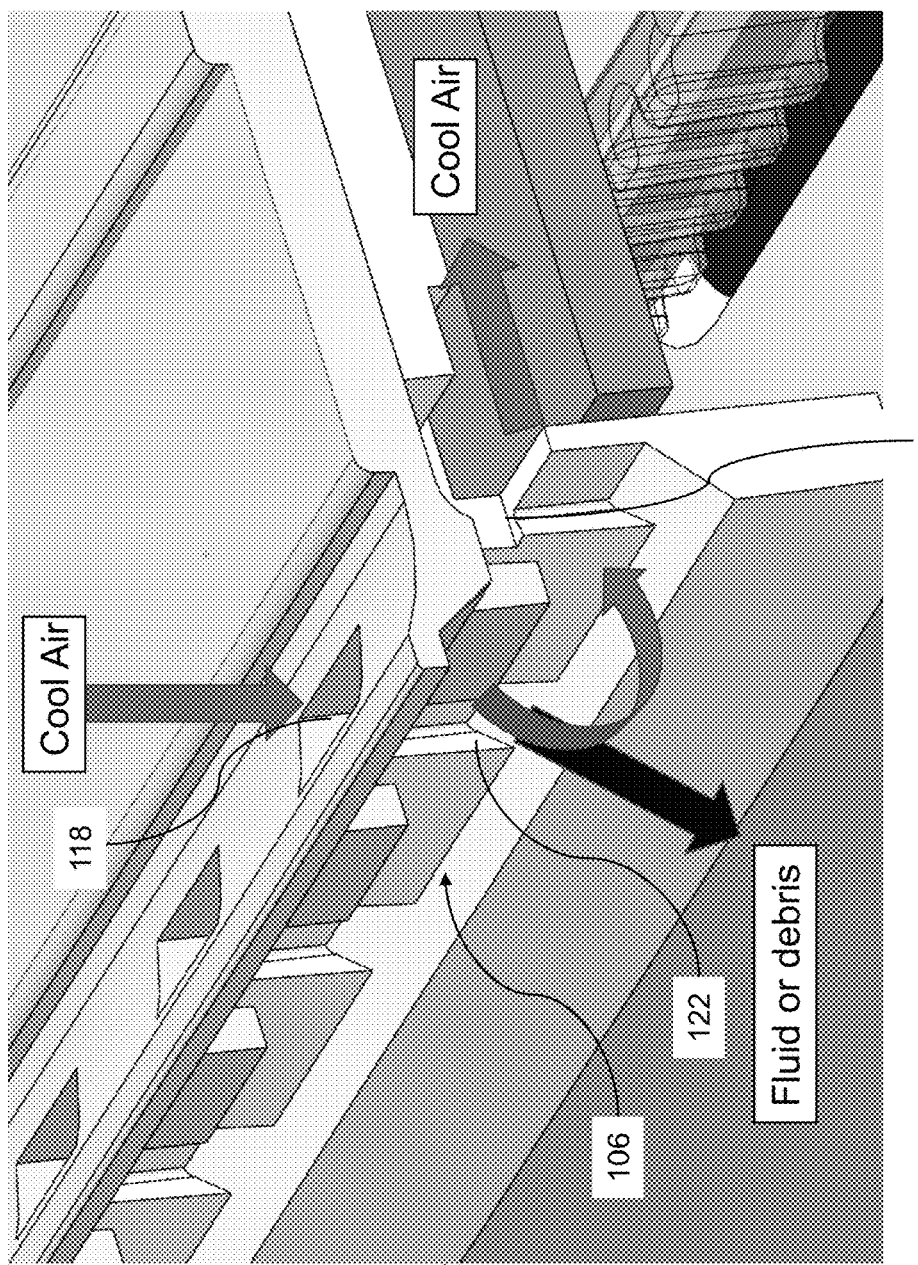
FIG. 6 is an enlargement of the section of FIG. 5 illustrating different paths for air flow and water and debris flow according to some embodiments.
Figure 5:
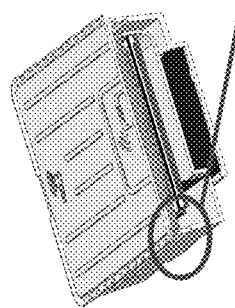
FIG. 5 is a perspective cross section view of the WDC of FIG. 3 according to some embodiments.
Figure 9:
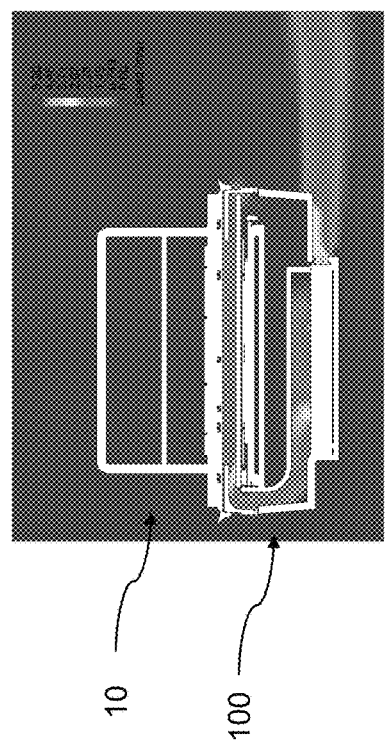
FIG. 9 is an alternate air velocity map view of the WDC of FIG. 1 according to some embodiments.
Figure 8:
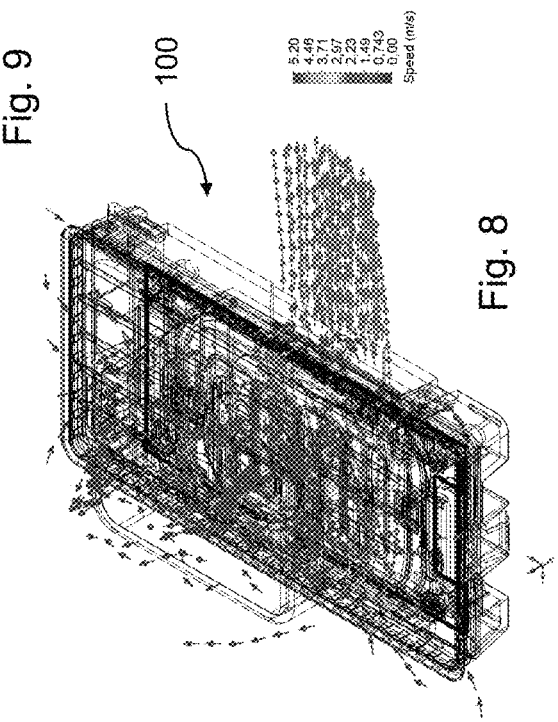
FIG. 8 is an air velocity map view of the WDC of FIG. 1 according to some embodiments.
Figure 7:
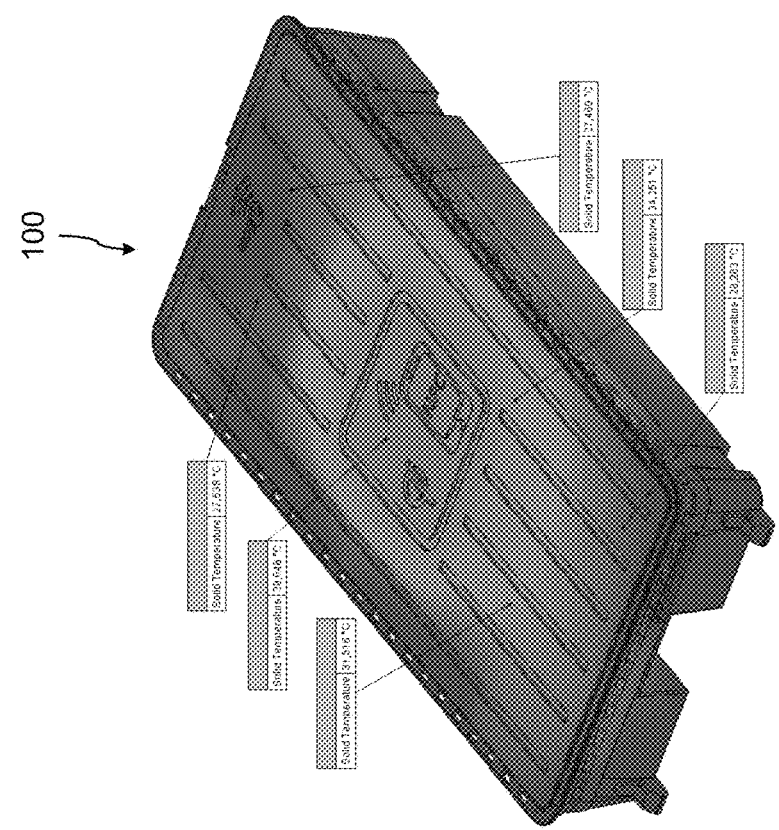
FIG. 7 is a thermal map view of the WDC of FIG. 1 according to some embodiments.
Figure 11:
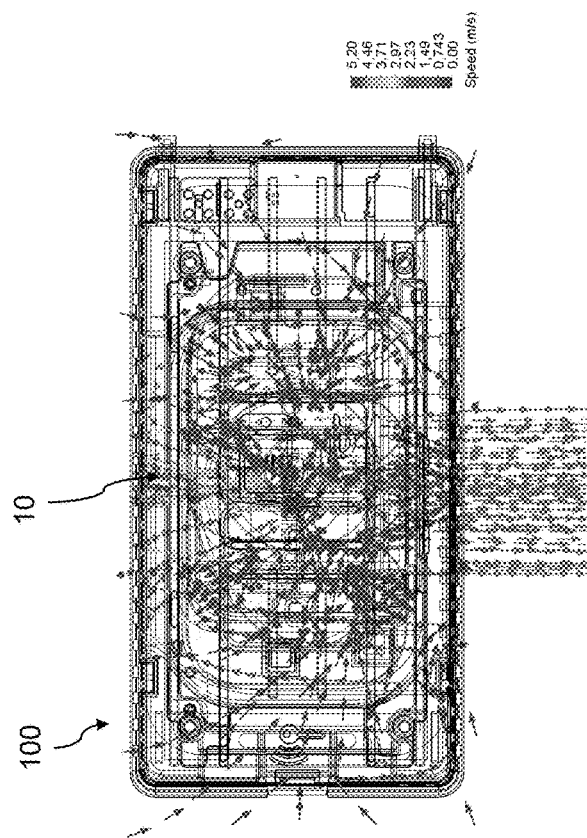
FIG. 11 is an air velocity map end view of the WDC of FIG. 1 with a personal electronic device resting on a top surface according to some embodiments.
Figure 10:
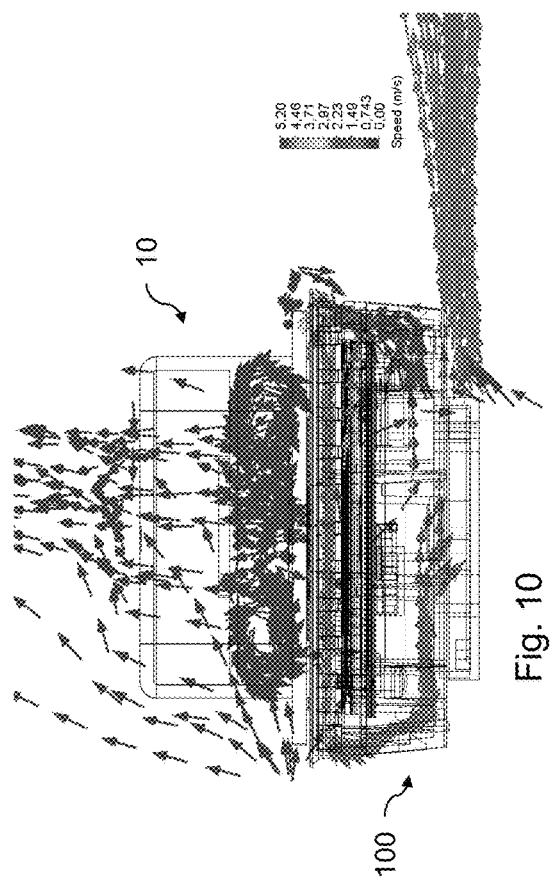
FIG. 10 is an air velocity map side view of the WDC of FIG. 1 with a personal electronic device resting on a top surface according to some embodiments.

As shown in FIG. 4, the inlet port 106 is a plurality of inlet ports located at the periphery of the top surface 110. Air is inducted by the fan 108 through the inlet ports from the vehicle cabin, into an air duct 114 that routes the air flow between the top surface 110 and the source coil and printed circuit board assembly 102 and exhausts the heated air though an outlet port 116. This air flow provides the benefit of cooling both the source coil and printed circuit board assembly 102 and the top surface 110, thereby reducing the heat from the WDC 100 to which the PED 10 is exposed.

A first portion 118 of the inlet port 106 through which the air is inducted from the from the passenger cabin of the vehicle is arranged generally orthogonally to a second portion 120 of the inlet port 106 through which the air flow enters into the housing 104. As used herein, generally orthogonal means the air flow axis of the first portion 118 is arranged within a range of 80 to 100 degrees relative to an airflow axis of the second portion 120. A third portion 122 of the inlet port 106 located opposite the first portion 118 defines an opening opposite the first portion 118 through which contaminants entering the inlet port 106 from the passenger cabin can exit the inlet port 106 without passing through the second portion 120 and entering the housing 104. This arrangement of the first, second and third portions 118, 120, 122 of the inlet port 106 allow contaminants, such as liquids or debris from the cabin, entering the inlet port 106 to flow or fall though the third portion 122 rather than entering the housing 104. The source coil and printed circuit board assembly 102 may be sealed from the air duct 114 to further inhibit contaminants that enter the housing 104 from affecting the source coil and printed circuit board assembly 102.

The top surface 110 has a rectangular shape. In the embodiment illustrated in FIGS. 1-3, the air duct 114 is configured to route the air flow through the housing 104 in a direction that is generally parallel to a major axis of the top surface 110. As used herein, generally parallel means±10 degrees of absolutely parallel. In the embodiment illustrated in FIGS. 4-11, the air duct 114 is configured to route the air flow through the housing 104 in a direction that is generally parallel to a minor axis of the top surface 110.

Figure 14:
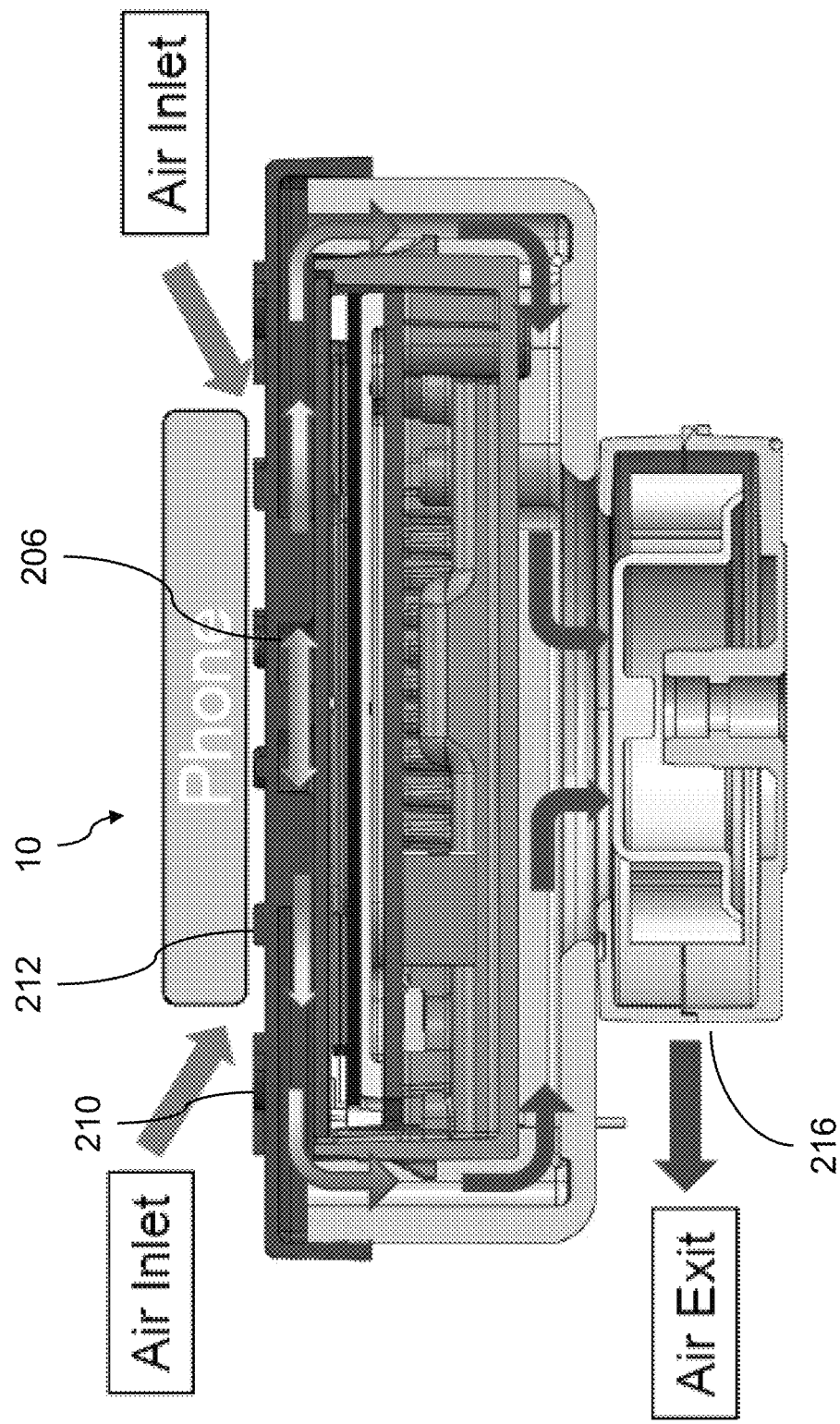
FIG. 14 is a cross section view of the WDC of FIG. 12 with a personal electronic device resting on a top surface illustrating an air flow path according to some embodiments.
Figure 16:
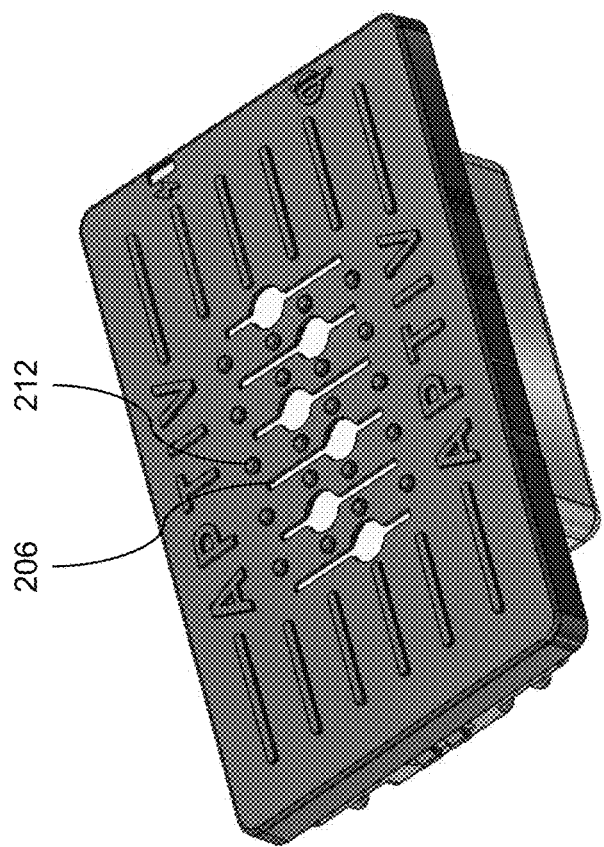
FIG. 16 is a perspective view of a WDC according to some embodiments.
Figure 15:
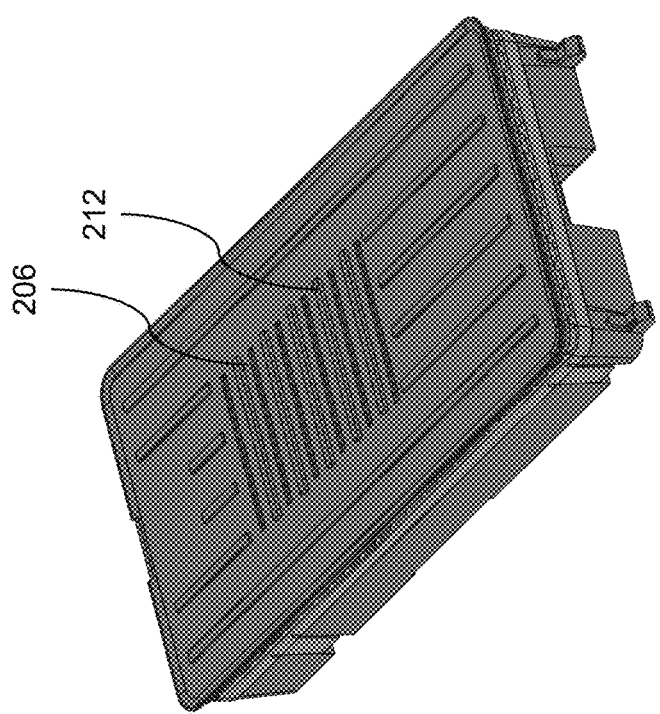
FIG. 15 is a perspective view of a WDC according to some embodiments.

FIGS. 12-16 illustrate another embodiment of the WDC 200 in which air from the vehicle cabin is pulled into an inlet port 206 that is arranged in a central portion of the top surface 210. As best shown in FIG. 14, the inlet port 206 is located under the PED 10 when the PED 10 is resting on the top surface 210. Air from the cabin is pulled under the PED 10, thereby actively cooling the PED 10 prior to the air flow entering the inlet port 206. The inlet port 206 includes a plurality of openings extending through the top surface 210. The plurality of openings is interspersed between a plurality of protrusions 212 in the form of raised ribs. In the example shown in FIGS. 12 and 13 the plurality of openings of the inlet port 206 are square holes arranged in a rectangular pattern. In the example shown in FIG. 15, the plurality of openings of the inlet port 206 are lateral slots that are arranged parallel to the minor axis of the top surface 210. The openings are interspersed between a plurality of lateral ribs that are arranged parallel to the minor axis of the top surface. In the example shown in FIG. 16, the lateral slots also include circular apertures or holes. The protrusions 212 of FIG. 16 have a hemispherical or spherical cap shape. In other embodiments, the protrusions may have a cylindrical or frustoconical shape. The shape and arrangement of the openings and protrusions shown in the figures is not limiting.

As shown in FIG. 14, the housing 204 is configured so that the air flow through the inlet port passes over two different sides of source coil and printed circuit board assembly 102 before exiting the outlet port 216.

Fan speed may be modulated through by measuring temperature of the WDC components or PED components and adjusting the blower speed for optimum cooling by air flow. Temperatures regulated with applied air flow provide improved PED charging levels and extend charging times even with high ambient temperatures (40° C. or higher within the vehicle).

As mentioned above, this invention optimizes the PED charging surface temperatures by removing or redistributing heat within the module thereby lowering PED charging surface temperatures. The result of lowering module surface temperatures is that it will extend PED charging times enhancing user experience. The automotive packaging environment is extremely tight even when trying to package a WDC. HVAC ducts that typically are located underneath or around the battery charger, if located within the center console area, contribute to higher WDC temperatures which limit air movement below the PED charging surface.

Accordingly, a wireless device charger (WDC) is provided. The WDC includes a fan, blower, or other air movement device to cool the components within the WDC to reduce heating of a personal electronic device (PED) being charged by the WDC, thereby reducing the chances of a thermal shutdown of the PED that would increase charging time of the battery in the PED. The WDC provides the benefit of using air from the vehicle cabin which is typically cooler than air within a vehicle console or instrument panel.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A wireless device charger configured to be installed within a passenger cabin of a vehicle, comprising:
    a source coil and a printed circuit board assembly configured to generate an alternating magnetic field;
    a housing in pneumatic communication with the passenger cabin, wherein the housing defines an inlet port configured to induct air from the passenger cabin into the housing, wherein a top surface of the housing has a rectangular shape and defines the inlet port, wherein the housing includes an air duct configured to route the air flow through the housing in a direction that is generally parallel to a minor axis of the top surface, and wherein the source coil and the printed circuit board assembly is sealed from the air duct; and
    an air movement device configured to produce an air flow into the inlet port and through the housing.

2. The wireless device charger according to claim 1, wherein the top surface of the housing is configured to allow a personal electronic device to rest upon.

3. The wireless device charger according to claim 1, wherein the top surface defines a plurality of protrusions extending from the top surface and configured to provide an air space between a personal electronic device and the top surface.

4. The wireless device charger according to claim 3, wherein the inlet port is sized, arranged, and located such that the air from the passenger cabin flows through the air space between the personal electronic device and the top surface before entering the inlet port when the air movement device produces the air flow into the inlet port and through the housing.

5. The wireless device charger according to claim 4, wherein the inlet port includes a plurality of openings extending through the top surface.

6. The wireless device charger according to claim 5, wherein the plurality of openings is interspersed between the plurality of protrusions.

7. The wireless device charger according to claim 5, wherein at least a portion of the plurality of openings are in the form of a plurality of elongated slots.

8. The wireless device charger according to claim 7, wherein the plurality of protrusions is in the form of a plurality of elongated ribs.

9. The wireless device charger according to claim 8, wherein the top surface has a rectangular shape and wherein the plurality of protrusions and the plurality of elongated slots are arranged parallel to a minor axis of the top surface.

10. The wireless device charger according to claim 8, wherein the plurality of elongated ribs is a first plurality of elongated ribs and wherein the plurality of protrusions includes a second plurality of elongated ribs arranged parallel to a major axis of the top surface.

11. The wireless device charger according to claim 6, wherein at least a portion of the plurality of openings are in the form of plurality of circular apertures.

12. The wireless device charger according to claim 6, wherein the plurality of protrusions each have a spherical cap shape.

13. The wireless device charger according to claim 6, wherein the plurality of protrusions each have a cylindrical shape.

14. The wireless device charger according to claim 1, wherein the inlet port is arranged in a central portion of the top surface.

15. The wireless device charger according to claim 14, wherein the housing is configured so that the air flow through the inlet port passes over two different sides of the source coil.

16. The wireless device charger according to claim 1, wherein the inlet port has a first portion through which the air is inducted from the from the passenger cabin of the vehicle that is arranged generally orthogonally to a second portion of the inlet port through which the air flow is exhausted into the housing.

17. The wireless device charger according to claim 16, wherein a third portion of the inlet port opposite the first portion defines an opening opposite the first portion through which contaminants entering the inlet port from the passenger cabin can exit the inlet port without passing through the second portion.

18. The wireless device charger according to claim 1, wherein the wireless device charger further comprises controller circuitry configured to control the air movement device to modulate the air flow via the air based on a temperature of a personal electronic device.

* * * * *